United States Patent
Dohi

(12) 
(10) Patent No.: US 6,646,098 B2
(45) Date of Patent: Nov. 11, 2003

(54) POLYCARBONATE RESIN MOLDING MATERIAL FOR OPTICAL USE AND OPTICAL DISK SUBSTRATE

(75) Inventor: Yutaka Dohi, Chiyoda-ku (JP)

(73) Assignee: Teijen Chemicals, Tokyo (JP)

( * ) Notice: Subject to any disclaimer, the term of this patent is extended or adjusted under 35 U.S.C. 154(b) by 0 days.

(21) Appl. No.: 10/133,355

(22) Filed: Apr. 29, 2002

(65) Prior Publication Data

US 2002/0173615 A1 Nov. 21, 2002

Related U.S. Application Data

(63) Continuation of application No. 09/762,942, filed as application No. PCT/JP99/04417 on Aug. 17, 1999, now abandoned.

(30) Foreign Application Priority Data

Aug. 18, 1998 (JP) ............................................ 10-231638
Dec. 21, 1998 (JP) ............................................ 10-362150

(51) Int. Cl.[7] .............................................. C08G 64/00
(52) U.S. Cl. ........................ 528/196; 428/64; 428/64.1
(58) Field of Search ................................ 528/196, 198; 428/64.1, 64

(56) References Cited

U.S. PATENT DOCUMENTS 6,316,071 B1 * 11/2001 Chosa et al. ............... 428/64.1

* cited by examiner

*Primary Examiner*—Terressa M. Boykin
(74) *Attorney, Agent, or Firm*—Sherman & Shalloway

(57) ABSTRACT

The present invention relates to a polycarbonate resin molding material for optical use which contains substances (A) having a 5% weight reduction start temperature measured by thermogravimetric analysis of 400° C. or less in a total amount of 1 wt % or less and to a polycarbonate resin molding material for optical use which contains substances (A) having a 5% weight reduction start temperature measured by thermogravimetric analysis of 400° C. or less in a total amount of 1 wt % or less and a sodium compound in an amount of 1 ppm or less in terms of metal sodium. The present invention also relates to optical disk substrates formed from these molding materials. According to the present invention, use of each of the above molding materials makes possible the continuous molding of an optical disk substrate and the obtained optical disk substrate has high quality and can retain reliability for a long time as an optical disk for a high-density recording medium.

14 Claims, No Drawings

POLYCARBONATE RESIN MOLDING MATERIAL FOR OPTICAL USE AND OPTICAL DISK SUBSTRATE

CROSS REFERENCE TO RELATED APPLICATION

This application is a continuation of application Ser. No. 09/762,942 filed Feb. 14, 2001, now abandoned which is a 35 U.S.C. §371 filing of PCT Application Serial No. PCT/JP99/04417 filed Aug. 17, 1999, which in turn claims priority from Japanese Application No. 10-231638 filed Aug. 18, 1998 and Japanese Application No. 10-362150 filed Dec. 21, 1998.

DESCRIPTION

1. Field of the Invention

The present invention relates to a polycarbonate resin molding material for optical use which volatilizes during the molding of an optical disk substrate and improves continuous productivity by reducing the amount of a substance (deposit) accumulated on a metal mold and a stamper and to an optical disk substrate. The present invention further relates to a polycarbonate resin molding material for optical use which volatilizes during the molding of an optical disk substrate, can improve continuous productivity by reducing the amount of a substance (deposit) accumulated on a metal mold and a stamper and retains high reliability for a long time and to an optical disk substrate made from the material.

2. Prior Art

Optical disks for recording and reproducing information by the irradiation of laser light, such as digital audio disks (so-called compact disks), optical video disks (so-called laser disks), various Write Once Optical disks, optomagnetic disks and phase change disks, have already been implemented.

Out of these, compact disks and laser disks are ROM (Read Only Memory) optical disks. In these optical disks, pits corresponding to information signals are formed in a transparent substrate as rugged shape and a 40 nm or more thick Al reflection layer is formed on the pits. In such optical disks, information signals are reproduced by detecting changes in reflectance caused by optical interferences generated by the pits.

Meanwhile, the Write Once Optical disks are recordable optical disks to which any information can be written by a user and optomagnetic disks and phase change disks are RAM (Random Access Memory) optical disks to which any information can be written many times.

That is, the recordable optical disk comprises a transparent substrate and a Write Once recording layer whose optical characteristics are changed irreversibly or rugged shapes are formed by the irradiation of laser light and which is formed on the transparent substrate. This recording layer is made from a cyanine-, phthallocyanine- or azo-based organic pigment which is decomposed by heating, for example, with the irradiation of laser light, whereby its optical constant is changed and its volume is also changed, thereby causing the deformation of the substrate.

The optomagnetic disk is a rewritable optical disk to which a user can write and erase information repeatedly and which comprises a vertically magnetized film having a magneto-optic effect (for example, Kerr Effect) such as a Tb—Fe—Co amorphous alloy thin film formed on a transparent substrate. In this optomagnetic disk, a recording pit is formed by magnetizing a micro area of the vertically magnetized film upward or downward according to an information signal. The information signal is reproduced making use of the fact that the rotation angle θk (Kerr rotation angle) of linear polarization of reflected light differs according to the magnetization direction of the vertically magnetized film.

The phase change disk is a rewritable disk like the optomagnetic disk and made from a Ge—Sb—Te phase change material which assumes a crystal state initially and changes from the crystal state to an amorphous state by the irradiation of laser light. In this recording layer, a recording pit is formed by changing the phase of a micro area according to an information signal and the information signal is reproduced by detecting a difference in reflectance between an amorphous portion corresponding to the pit and other crystal area.

The optomagnetic disk and phase change disk are in most cases a disk having a four-layer structure consisting of a recording layer, two transparent dielectric layers sandwiching the recording layer from both sides of the recording layer and an Al reflection layer formed on the dielectric layer in order to prevent the oxidation of the recording layer and increase the degree of signal modulation by multiple interferences. The dielectric layer is a silicon nitride film or $Zn$—$SiO_2$ composite film.

Studies have recently been made energetically on use of the above optical disks for recording digital images, and a digital versatile disk (DVD) has been developed as such an optical disk.

This DVD has the same diameter as CD (120 mm) but can record image information equivalent to one movie film and reproduce image information of quality as high as current TV images.

To record such image information on an optical disk, a recording capacity 6 to 8 times more than CD is necessary. Therefore, in DVD, the wavelength of laser light is reduced to 635 to 650 nm compared with 780 nm for CD and the numerical aperture (NA) of an objective lens is increased to 0.52 or 0.6 compared with 0.45 for CD, thereby reducing the track pitch or the shortest recording mark length of a pit to increase the recording density.

An increase in the numerical aperture (NA) of an objective lens results in a reduction in the tolerance of deflection of a disk substrate. Therefore, compared with 1.2 mm for CD, the thickness of a DVD substrate is reduced to 0.6 mm so as to shorten the distance of the disk substrate through which laser light passes, thereby compensating for the reduction in the tolerance of warpage (Nikkei Electronics No. 630 issued on Feb. 27, 1995). To compensate for a reduction in the strength of a disk caused by the reduction in the thickness of the substrate, a so-called laminate structure that another substrate is laminated on a recording layer formed on a substrate is employed as disclosed by JP-A 6-274940 (the term "JP-A" as used herein means an "unexamined published Japanese patent application"). The recording layer of the laminated optical disk is a ROM recording layer, recordable recording layer or RAM recording layer used in the above-described single substrate structure.

Further, the laminated optical disk includes a one-side laminated optical disk using only one side thereof and a both side laminated optical disk using both sides thereof.

A polycarbonate resin which has excellent moldability, strength, light transmittance and humidity resistance is used in most of the above optical disk substrates.

However, when substrates are molded continuously, the characteristic properties such as transferability and optical and mechanical properties of the substrates deteriorate and dust is adhered to the substrates.

It has been found that volatile matter generated from the polycarbonate is adhered to a metal mold or a stamper as the cause of the above problems, thereby causing such a trouble as outgassing with the result that the optical and mechanical properties of the substrates deteriorate and the deposit comes off, falls on the stamper and is transferred to the substrate.

Therefore, a measure for reducing the amount of a low molecular weight polycarbonate compound contained in the raw materials as a causative agent is taken. For example, as described in JP-A 9-208684, the formation of a deposit is prevented by reducing the amount of a low molecular weight polycarbonate compound having a molecular weight of 1,000 or less contained in a polycarbonate. However, it has been confirmed that the agent of the deposit is not only the low molecular weight polycarbonate compound and that this effect is not sufficient.

The polycarbonate resin is readily hydrolyzed at a high temperature and a high humidity, resulting in reductions in molecular weight and impact strength. Further, when it is left at a high temperature and a high humidity for a long time, very small white points are formed on the substrate, thereby impairing long-term reliability.

Meanwhile, one of characteristic properties required of an optical disk substrate and an optical information recording medium comprising the same is the retention of high reliability for a long time. However, as the polycarbonate resin is easily hydrolyzed at a high temperature and a high humidity, it has been difficult to fully satisfy this requirement.

Problems to be solved by the Invention

Currently, the continuous molding of compact disk substrates which are generally used must be suspended for the cleaning of a metal mold and a stamper to remove a deposit on them. Therefore, it has been found that there is limitation to the throughput of continuous production and that the productivity of a substrate material for high recording density optical disks typified by CD-R, MO, MD-MO and further DVD-ROM, DVD-Video, DVD-R and DVD-RAM is not improved.

For the molding of a high recording density optical disk substrate for DVD-ROM and DVD-RAM, the molding temperature must be increased to about 380° C. so as to improve the fluidity and transferability of a resin, which increases the amount of volatile matter from a polycarbonate resin and narrows the vent clearance of a metal mold, thereby promoting the accumulation of volatile matter.

The present invention has been made in view of the above problems and it has been discovered from intensive studies on solutions to the above problems that the amount of a deposit on a metal mold and a stamper during molding is greatly reduced and productivity is surprisingly improved while the characteristic properties of a substrate are fully retained by reducing the total amount of substances having a 5% weight reduction start temperature measured by thermogravimetric analysis of 400° C. or less to 1 wt % or less as means of reducing volatile matter from a polycarbonate.

SUMMARY OF THE INVENTION

According to the present invention, there are provided (1) a polycarbonate resin molding material for optical use which contains substances (A) having a 5% weight reduction start temperature measured by thermogravimetric analysis of 400° C. or less in a total amount of 1 wt % or less, (2) a polycarbonate resin molding material for optical use, wherein when 10,000 CD substrates are molded at a cylinder temperature of 340° C. and a mold temperature of 75° C., the amount of a deposit on a stamper is 15 mg or less, (3) a polycarbonate resin molding material for optical use, wherein when 10,000 DVD substrates are molded at a cylinder temperature of 380° C. and a mold temperature of 115° C., the amount of a deposit on a stamper is 15 mg or less, and (4) optical disk substrates made from these molding materials.

The term "deposit" as used in this specification means a liquid or solid substance accumulated on the periphery of a stamper or in the vent portion or gap of a metal mold caused by molding continuously of optical disk substrate. Therefore, it can be said that the substances (A) are deposit forming substances in the present invention.

According to the present invention, in order to obtain sufficient reliability for a disk substrate for use in high-density optical disks such as digital video disks, substances contained in a molding material (aromatic polycarbonate resin) for molding the substrate must have a 5% weight reduction start temperature measured by thermogravimetric analysis of 400° C. or less and the substances (A) must be contained in a total amount of 1 wt % or less.

Substances having a 5% weight reduction start temperature of 400° C. or more rarely volatilize from a polycarbonate whereas substances having a 5% weight reduction start temperature of 100° C. or less volatilize and are discharged to the outside of a metal mold without being accumulated and are not adhered to a stamper or/and a metal mold. When continuous molding is carried out using a material which contains substances having a 5% weight reduction start temperature of 400° C. or less in a total amount of more than 1 wt %, a deposit is accumulated on a metal mold and a stamper in a relatively early stage and sufficient productivity cannot be obtained.

When the total amount of the substances (A) having a 5% weight reduction start temperature of 400° C. or less, preferably 100 to 400° C., is 1.0 wt % or less, preferably 0.5 wt % or less, more preferably 0.3 wt % or less, a more stabilized effect can be obtained. It is preferred to reduce the total amount of the substances as much as possible but it is substantially impossible to completely eliminate these substances. The minimum total amount of the substances is 0.0001 wt % and when the total amount is 0.001 wt % or more, economical efficiency becomes high.

The substances (A) contained in the polycarbonate and having a 5% weight reduction start temperature of 400° C. or less include unreacted products of a raw material used for the production of the polycarbonate and a terminal capping agent and modified products thereof, catalyst, deactivator, substances related to the production of the polycarbonate such as low molecular weight materials exemplified by polycarbonate oligomers (may be referred to as "substances derived from PC productions" hereinafter), and stabilizers including a heat stabilizer, antioxidant and ultraviolet light absorber, release agent, modified products thereof and all of which are added to improve the characteristic properties of a polycarbonate resin (may be referred to as "substances derived from additives" hereinafter).

The substances derived from PC production will be described in detail hereinafter. The low molecular weight materials exemplified by polycarbonate oligomers are a low molecular weight carbonate oligomer containing 1 to 5 diphenol skeletons (or raw material monomer skeletons) used as a raw material.

Examples of the raw material include diphenols typified by bisphenol A and carbonate esters typified by diphenyl carbonate. Examples of the terminal capping agent include monofunctional phenols such as p-tert-butylphenol and p-cumylphenol. Examples of the modified products of the unreacted products of the raw material and the terminal capping agent include monocarbonate compounds of the raw material monomer and the terminal capping agent and carbonate compounds of terminal capping agents.

Most of the substances derived from PC production are a low molecular weight material represented by the following general formula (1):

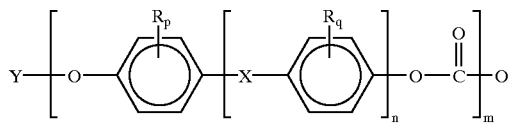

(1)

wherein X is a group for combining two phenols when a diphenol forming the polycarbonate is a compound having a bisphenol skeleton, as exemplified by alkylene group, alkylidene group, cycloalkylidene group which may be substituted by an alkyl group, —O—, —CO—, —OCO—, —S—, —SO— or —SO$_2$, Y is a hydrogen atom or a group represented by

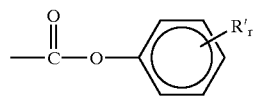

(R' is a hydrogen atom or alkyl group having 1 to 25 carbon atoms, and r is an integer of 1 to 5), R is a hydrogen atom or alkyl group having 1 to 4 carbon atoms with the proviso that when there are two or more R's, they are the same or different, p and q are the same or different and each an integer of 1 to 4, m is an integer of 1 to 5, and n is 0 or 1.

The method of reducing the amounts of the substances derived from PC production is not particularly limited. There have been made various proposals for reducing the amount of the low molecular weight material of a polycarbonate. For example, JP-A 63-278929, JP-63-316313 and JP-A 1-146926 propose such methods.

Stated specifically, these methods may be carried out repeatedly, combined together or combined with other methods.

A description is subsequently given of the substances derived from additives. Typical examples of the substances derived from additives are a stabilizer and a release agent.

A phosphorus-containing antioxidant is mainly used as a stabilizer. Examples of the phosphorus-containing antioxidant include phosphates, phosphorous acid and phosphites represented by the following formulas (2) and (3). Most of the phosphorus-containing antioxidants have functions for serving as a heat stabilizer for aromatic polycarbonate resins.

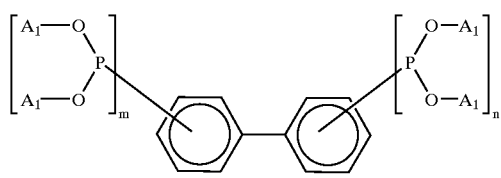

(2)

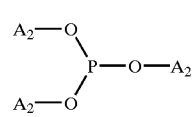

(3)

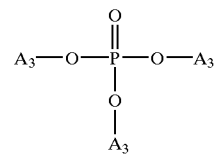

(4)

In the above formulas (2) to (4), m and n are independently an integer of 0 to 2 and (m+n) is 1 or 2.

$A_1$ to $A_3$ are the same or different and each an alkyl group having 1 to 9 carbon atoms, phenyl group, phenylalkyl group (alkyl moiety has 1 to 9 carbon atoms) or alkylphenyl group (alkyl moiety has 1 to 9 carbon atoms). $A_2$ and/or $A_3$ may be a hydrogen atom.

Illustrative examples of the phosphorus-containing antioxidant represented by the above formulas (2) to (4) include tris(2,4-di-t-butylphenyl)phosphite, tris(mono- and di-nonylphenyl)phosphite, tetrakis (2,4-di-t-butylphenyl)4, 4'-biphenylene-di-phosphonite and the like.

Out of the substances derived from additives, the release agent can be represented by the following formula (5)

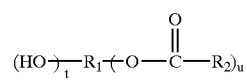

(5)

In the above formula (5), $R_1$ is an alkyl group having 1 to 22 carbon atoms or alkylene group, $R_2$ is an alkyl group having 12 to 22 carbon atoms, t is 0 or a positive integer, u is a positive integer, and (t+u) is an integer of 1 to 6, preferably 1 to 4.

The substances derived from PC production and the substances derived from additives which are represented by the above formulas (1) to (5) are given as examples and other substances having a 5% weight reduction start temperature of 400° C. or less are included in the category of the substances (A) as the deposit forming substances of the present invention.

The total amount of the above deposit forming substances contained in the polycarbonate resin molding material for optical use of the present invention is 1 wt % or less. The total amount is preferably as small as possible.

The 5% weight reduction start temperatures of some of the above deposit forming substances were measured. That is, using the 951 TGA apparatus of DuPont Co., Ltd., the 5% weight reduction start temperature was measured under a nitrogen atmosphere at a temperature elevation rate of 10° C./min. A low molecular weight polycarbonate oligomer containing 1 or 2 bisphenol A skeletons had a 5% weight reduction start temperature of 370±10° C. As for raw material-related substances, bisphenol A had a 5% weight reduction start temperature of 257±5° C., diphenyl carbonate had a 5% weight reduction start temperature of 139±5° C., p-tert-butylphenol had a 5% weight reduction start temperature of 145±5° C., p-cumylphenol had a 5% weight reduction start temperature of 170±5° C., and di-t-butylphenyl carbonate which is a carbonate bonded product of a terminal capping agent had a 5% weight reduction start temperature of 240±5° C. As for the additive-related substances, tris(2,4-di-t-butylphenyl)phosphite which is an antioxidant had a 5% weight reduction start temperature of 254±5° C., tris(mono-nonylphenyl)phosphite had a 5% weight reduction start temperature of 218±5° C., stearyl stearate which is a release agent had a 5% weight reduction start temperature of 276±5° C., behenyl behenate had a 5% weight reduction start temperature of 302±5° C., pentaerythritol tetrastearate had a 5% weight reduction start temperature of 356±5° C., glycerin tristearate had a 5% weight reduction start temperature of 355±5° C. and glycerin monostearate had a 5% weight reduction start temperature of 245±5° C.

These measurement values change by around 10° C. according to the purity and crystallinity of a product. It is only illustrated that all of the above compounds have a 5% weight reduction start temperature of 400° C. or less.

The polycarbonate resin always contains substances derived from PC production (A-1) such as a raw material monomer and a modified product thereof and a low molecular weight polycarbonate and substances derived from additives (A-2) such as a heat stabilizer, release agent and modified products thereof as deposit forming substances. The weight ratio of (A-1) to (A-2) is 10:90 to 90:10, preferably 15:85 to 85:15, more preferably 20:80 to 80:20 based on 100 wt % of the collected deposit.

The deposit forming substances always contain both (A-1) and (A-2) and the ratio of (A-1) to (A-2) changes according to resin composition (the amounts of additives and the content of an oligomer) and molding conditions.

According to the above-described present invention, when an optical disk substrate is to be molded from a polycarbonate resin molding material, the amount of a deposit adhered to a metal mold or a stamper is greatly reduced and a large number of disks can be molded continuously by reducing the total amount of the substances (A) having a 5% weight reduction start temperature of 400° C. or less contained in the molding material to 1 wt % or less. Therefore, according to the present invention, there is provided a polycarbonate resin molding material for optical use, wherein when 10,000 optical disk substances are molded at a cylinder temperature of 340° C. and a mold temperature of 75° C., the amount of a deposit on a stamper is 15 mg or less, preferably 10 mg or less.

The above cylinder temperature and mold temperature are average temperatures when compact disk substrates are molded.

According to the present invention, there is further provided a polycarbonate resin molding material for optical use, wherein when 10,000 optical disk substances are molded at a cylinder temperature of 380° C. and a mold temperature of 115° C., the amount of a deposit on a stamper is 15 mg or less, preferably 10 mg or less.

The above cylinder temperature and mold temperature are average temperatures when DVD disk substrates are molded.

The inventors of the present invention have conducted researches on the further improvement of a polycarbonate resin molding material which enables long-time continuous molding and gives a high-quality optical disk substrate.

That is, when an optical disk (or its substrate) made from a polycarbonate resin is maintained at a high temperature and a high humidity for a long time, very small white points may be formed on the surface of the substrate or in the substrate, become bigger along the passage of time and affect the reliability of a recording medium. Therefore, the present inventors have conducted researches to find the cause of forming the white points. An influence exerted by the formation of the very small white points is more marked in digital versatile disks such as DVD-ROM, DVD-Video, DVD-R and DVD-RAM having extremely high information storage density than normal compact disks (CD).

To find the cause of forming the very small white points on the disk substrate, the present inventors have conducted further researches paying attention to metal compounds contained in a polycarbonate resin. The polycarbonate resin is produced industrially using many apparatuses and equipment. That is, many apparatuses and equipment such as raw material tanks, polymerizer, purifier, granulating apparatus, product storage tanks and transfer pipes are used, which differ according to production process. Most of the apparatuses and equipment are made from stainless steel and other corrosion resistant steel materials. Therefore, the industrially produced polycarbonate resin contains many metal components derived from a catalyst, additives, solvent and the materials of apparatuses and equipment used in the production process in no small quantities.

According to the present invention, it has been found that in order to obtain sufficient long-term reliability for a disk substrate for use in a high-density optical disk such as a digital video disk, the content of Na or an Na compound in a molding material (aromatic polycarbonate resin) used to mold the substrate must be reduced to 1 ppm or less in terms of metal Na as well as the reduction of the total amount of the deposit forming substances.

It has been revealed that when the content of Na is larger than 1 ppm, the number of very small white points increases, causing a problem in reading signals and exerting a bad influence upon reliability.

Consequently, according to the present invention, there is provided a polycarbonate resin molding material for optical use which contains substances (A) having a 5% weight reduction start temperature measured by thermogravimetric analysis of 400° C. or less in a total amount of 1 wt % or less and a sodium compound in an amount of 1 ppm or less in terms of metal sodium.

Therefore, it is desired to employ means of preventing the elution or mixing of Na as much as possible in the production process of a polycarbonate resin. As one of the means, it is recommended to use a steel material having a small content of Na and select a material with a small amount of eluting Na. A method of removing a Na compound may also be employed. This means is precision filtration, washing in pure water having high purity which contains no metal ions or water-soluble impurities, or the like.

It is also desired to reduce the contents of metals of the group VIII other than Na, such as Al, Si, Ca, Mg and Cr, as other metal components to 1 ppm or less.

The content of a sodium compound in the polycarbonate resin is preferably 0.6 ppm or less, particularly preferably 0.5 ppm or less in terms of metal sodium.

According to the present invention, there can be obtained such advantages that when a polycarbonate resin containing deposit forming substances and a sodium compound in the above small amounts is used to mold optical disk substrates, the amount of a deposit on a metal mold and a stamper is extremely small even in the case of long-term continuous molding, thereby making it possible to mold optical disks at a high yield, and further that when the obtained optical disk (or substrate) is maintained at a high temperature and a high humidity for a long time, the number of white points formed on the surface of the substrate or in the substrate is extremely small, thereby making it possible to obtain an optical disk which is capable of retaining reliability for a long time.

Therefore, according to the present invention, there is provided a polycarbonate resin molding material for optical use, wherein (1) when 10,000 CD optical disk substrates are molded at a cylinder temperature of 340° C. and a mold temperature of 75°C., the amount of a deposit on a stamper is 15 mg or less and (2) the number of white point defects of 20 μm or more in size is 2 or less (preferably 1 or less) per a 120 mm diameter disk-like substrate after an acceleration deterioration test (80° C.×85% RH×1,000 hours) on the optical disk substrates.

According to the present invention, there is further provided a polycarbonate resin molding material for optical use, wherein (1) when 10,000 CD optical disk substrates are molded at a cylinder temperature of 380° C. and a mold temperature of 115° C., the amount of a deposit on a stamper is 15 mg or less and (2) the number of white point defects of 20 μm or more in size is 2 or less (preferably 1 or less) per a 120 mm diameter disk-like substrate after an acceleration deterioration test (80° C.×85% RH×1,000 hours) on the optical disk substrates.

A description is subsequently given of the polycarbonate resin and production method thereof in the present invention.

The polycarbonate resin used in the present invention is generally obtained from a reaction between a diphenol and a carbonate precursor by a solution method or melting method. Typical examples of the diphenol used herein include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (so-called bisphenol A), 2,2-bis{(4-hydroxy-3-methyl)phenyl}propane, 2,2-bis{(4-hydroxy-3,5-dimethyl)phenyl}propane, 2,2-bis{(3,5-dibromo-4-hydroxy)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, a, α, α'-bis(4-hydroxyphenyl)-o-diisopropylbenzene, α, α'-bis(4-hydroxyphenyl)-m-diisopropylbenzene, α, α'-bis(4-hydroxyphenyl)-p-diisopropylbenzene, 1,3-bis(4-hydroxyphenyl)-5,7-dimethyladamantane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether, 4,4'-dihydroxydiphenyl ester and the like. They may be used alone or in admixture of two or more.

Out of these, homopolymers and copolymers obtained from at least one bisphenol selected from the group consisting of bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α, α'-bis(4-hydroxyphenyl)-m-diisopropylbenzene are preferred, and a bisphenol A homopolymer and a copolymer of 1,1-bis(4-hydroxyphenyl)-3,3,5-trimethylcyclohexane and bisphenol A, 2,2-bis{(4-hydroxy-3-methyl)phenyl}propane or α, α'-bis(4-hydroxyphenyl)-m-diisopropylbenzene are particularly preferred.

A carbonyl halide, carbonate ester or haloformate is used as the carbonate precursor, as exemplified by phosgene, diphenyl carbonate and dihaloformates of diphenols.

To produce a polycarbonate resin by reacting the above diphenol with the carbonate precursor by an interfacial polymerization or melt polymerization method, a catalyst, terminal capping agent and antioxidant for the diphenol and the like may be used as required. The polycarbonate resin may be a branched polycarbonate resin containing a polyfunctional aromatic compound having a functionality of 3 or more, a polyester carbonate resin containing an aromatic or aliphatic dicarboxylic acid, or a mixture of two or more of the obtained polycarbonate resins.

The reaction carried out by the interfacial polymerization method is generally a reaction between a diphenol and phosgene in the presence of an acid binder and an organic solvent. Examples of the acid binder include alkali metal hydroxides such as sodium hydroxide and potassium hydroxide and amine compounds such as pyridine. Examples of the organic solvent include hydrocarbon halides such as methylene chloride and chlorobenzene. A catalyst such as a tertiary amine, quaternary ammonium compound or quaternary phosphonium compound exemplified by triethylamine, tetra-n-butylammonium bromide and tetra-n-butylphosphonium bromide may be used to promote the reaction. The reaction temperature is generally 0 to 40° C., the reaction time is about 10 minutes to 5 hours, and pH during the reaction is preferably maintained at 9 or more.

A terminal capping agent is generally used in the above polymerization reaction. A monofunctional phenol may be used as the terminal capping agent. The monofunctional phenol is generally used as the terminal capping agent to adjust molecular weight and the obtained polycarbonate resin is capped by a group derived from the monofunctional phenol to be superior in thermal stability to a polycarbonate resin whose terminal is not capped. The monofunctional phenol is a phenol or lower alkyl-substituted phenol exemplified by monofunctional phenols represented by the following general formula (T-1):

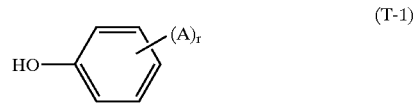

wherein A is a hydrogen atom, linear or branched alkyl group having 1 to 9 carbon atoms or phenyl group-substituted alkyl group, and r is an integer of 1 to 5, preferably 1 to 3.

Examples of the monofunctional phenol include phenol, p-tert-butylphenol, p-cumylphenol and isooctylphenol.

Other monofunctional phenols include phenols and benzoic acid chlorides having a long-chain alkyl group or aliphatic polyester group as a substituent, and long-chain alkyl carboxylic acid chlorides. When they are used to cap the terminal of a polycarbonate copolymer, they not only serve as a terminal capping agent or molecular weight modifier but also improve the melt fluidity of a resin, thereby making molding easy, and has the effect of improving the physical properties of a substrate, especially reducing the water absorption of the resin and the effect of suppressing the birefringence of the substrate. Out of these, phenols having a long-chain alkyl group as a substituent and represented by the following general formulas (T-2) and (T-3) are preferred:

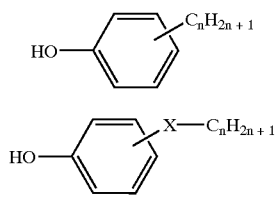

wherein X is —R—O—, —R—CO—O— or —R—O—CO— (R is a single bond or divalent aliphatic hydrocarbon group having 1 to 10 carbon atoms, preferably 1 to 5 carbon atoms) and n is an integer of 10 to 50.

The substituted phenol of the general formula (T-2) is preferably a phenol in which n is an integer of preferably 10 to 30, particularly preferably 10 to 26, as exemplified by decyl phenol, dodecyl phenol, tetradecyl phenol, hexadecyl phenol, octadecyl phenol, eicosyl phenol, docosyl phenol and triacontyl phenol.

The substituted phenol of the general formula (T-3) is preferably a compound in which X is —R—CO—O—, R is a single bond and n is an integer of preferably 10 to 30, particularly preferably 10 to 26, as exemplified by decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate.

The terminal capping agent is introduced in an amount of at least 5 mol %, preferably at least 10 mol % based on the total of all the terminals of the obtained polycarbonate resin. The above terminal capping agents may be used alone or in admixture of two or more.

The reaction carried out by the melting method is generally an ester exchange reaction between a diphenol and a carbonate ester which is carried out in the presence of an inert gas by mixing together the diphenol and the carbonate ester under heating and distilling off the formed alcohol or phenol. The reaction temperature, which changes according to the boiling point or the like of the formed alcohol or phenol, is generally 120 to 350° C. In the latter stage of the reaction, the pressure of the reaction system is reduced to 10 to 0.1 Torr (about 1,330 Pa to 13 Pa) to facilitate the distillation off of the formed alcohol or phenol. The reaction time is generally about 1 to 4 hours.

The carbonate ester is an ester such as an aryl group having 6 to 10 carbon atoms, aralkyl group or alkyl group having 1 to 4 carbon atoms which may be substituted. Examples of the carbonate ester include diphenyl carbonate, ditolyl carbonate, bis(chlorophenyl)carbonate, m-cresyl carbonate, dinaphthyl carbonate, bis(diphenyl)carbonate, dimethyl carbonate, diethyl carbonate, dibutyl carbonate and the like. Out of these, diphenyl carbonate is preferred.

To accelerate the rate of polymerization, a polymerization catalyst may be used. Examples of the polymerization catalyst include alkali metal compounds such as sodium hydroxide, potassium hydroxide, and sodium salts and potassium salts of diphenols; alkali earth metal compounds such as calcium hydroxide, barium hydroxide and magnesium hydroxide; nitrogen-containing basic compounds such as tetramethylammonium hydroxide, tetraethylammonium hydroxide, trimethylamine and triethylamine; alkoxides of alkali metals and alkali earth metals; organic acid salts of alkali metals and alkali earth metals; zinc compounds; boron compounds; aluminum compounds; silicon compounds; germanium compounds; organic tin compounds; lead compounds; osmium compounds; antimony compounds; manganese compounds; titanium compounds; and zirconium compounds, all of which are generally used for an esterification reaction or ester exchange reaction. These catalysts may be used alone or in combination of two or more. The amount of the polymerization catalyst is preferably $1\times10^{-8}$ to $1\times10^{-3}$ equivalent, more preferably $1\times10^{-7}$ to $5\times10^{-4}$ equivalent based on 1 mol of the diphenol as a raw material.

To reduce the number of phenolic terminal groups in the polymerization reaction, a compound such as bis (chlorophenyl)carbonate, bis(bromophenyl)carbonate, bis (nitrophenyl)carbonate, bis(phenylphenyl)carbonate, chlorophenylphenyl carbonate, bromophenylphenyl carbonate, nitrophenylphenyl carbonate, phenylphenyl carbonate, methoxycarbonylphenylphenyl carbonate or ethoxycarbonylphenylphenyl carbonate is preferably added in the latter stage of a polymerization reaction or after the end of the polymerization reaction. Out of these, 2-chlorophenylphenyl carbonate, 2-methoxycarbonylphenylphenyl carbonate and 2-ethoxycarbonylphenylphenyl carbonate are preferred, and 2-methoxycarbonylphenylphenyl carbonate is particularly preferred.

The viscosity average molecular weight (M) of the polycarbonate resin is preferably 10,000 to 22,000, more preferably 12,000 to 20,000, particularly preferably 13,000 to 18,000. The polycarbonate resin having the above viscosity average molecular weight has sufficient strength as an optical material and excellent melt fluidity at the time of molding and is free from molding distortion. Therefore, molding distortion does not occur advantageously. The viscosity average molecular weight as used herein is obtained by inserting a specific viscosity ($\eta_{sp}$) obtained from a solution of 0.7 g of a polycarbonate resin dissolved in 100 ml of methylene chloride at 20° C. into the following expression.

$$\eta_{sp}/c[\eta]+0.45\times[\eta]^2c$$

([$\eta$] is an intrinsic viscosity)

$$[\eta]=1.23\times10^{-4}\ M^{0.83}$$

c=0.7

It is preferred that impurities and foreign matter such as low-molecular weight components and unreacted components should be removed by filtering the polycarbonate resin in a solution state after it is produced by the above conventionally known commonly used method (such as interfacial polymerization or melt polymerization) or washing a granular raw material after granulation (solvent has been removed) with a poor solvent such as acetone under heating. In the extrusion step (pelletization step) for obtaining a pellet of the polycarbonate resin to be injection molded, foreign matter is preferably removed by passing the polycarbonate resin through a sintered metal filter having a filtration accuracy of 10 $\mu$m while it is molten. An additive such as a phosphorus-based antioxidant is preferably added as required. In either case, it is necessary to reduce the amounts of foreign matter, impurities and solvent as much as possible for a resin as a raw material before injection molding.

An injection molding machine (including an injection compression molding machine) is used to produce an optical disk substrate from the above polycarbonate resin. A generally used injection molding machine may be used but an injection molding machine including cylinders and screws made from a material having low adhesion to resins, corrosion resistance and abrasion resistance is preferred to suppress the formation of a carbide and improve the reliability of a disk substrate. As for injection molding conditions, the cylinder temperature is preferably 300 to 400° C. and the mold temperature is preferably 50 to 140° C., whereby an optically excellent optical disk substrate can be obtained. The environment of the molding step is as clean as possible in consideration of the object of the present invention. It is also important to remove water by drying a material to be molded completely and to eliminate residence for causing the decomposition of a molten resin.

The thus molded optical disk substrate is used as a substrate for a high-density optical disk exemplified by compact disks (may be abbreviated as CD hereinafter), CD-R, MO, MD-MO and further digital video disks (may be abbreviated DVD hereinafter), DVD-ROM, DVD-video, DVD-R and DVD-RAM.

EXAMPLES

The following examples are provided for the purpose of further illustrating the present invention but are in no way to be taken as limiting. Evaluations were made in accordance with the following methods.

(a) adhesion measurement test

A CD metal mold is set in the DISK3 M III injection molding machine of Sumitomo Heavy Industries, Ltd., a nickel CD stamper having a pit is set in this metal mold, a molding material is injected into the hopper of the molding machine automatically, and 10,000 optical disk substrates having a diameter of 120 mm and a thickness of 1.2 mm are molded continuously at a cylinder temperature of 340° C., a mold temperature of 70° C., an injection speed of 100 mm/sec and a holding pressure of 40 kgf/cm$^2$. Also, a DVD metal mold is set in a similar molding machine, a nickel DVD stamper including information such as an address signal is set in the metal mold, and 10,000 optical disk substrates having a diameter of 120 mm and a thickness of 0.6 mm are molded continuously at a cylinder temperature of 380° C., a mold temperature of 115° C., an injection speed of 300 mm/sec and a holding pressure of 40 kgf/cm$^2$.

After 10,000 optical disk substrates are molded continuously, a deposit on the stamper was extracted and dry solidified with chloroform to measure the amount of the deposit.

The amount of the deposit is evaluated according to the following criteria.

evaluation criteria

A: 1 to 7 mg of deposit after molding of 10,000 substrates
B: 8 to 15 mg of deposit after molding of 10,000 substrates
C: 16 mg or more of deposit after molding of 10,000 substrates
D: deposit is transferred to substrates before molding of 10,000 substrates (b) quantitative determination of substrates derived from PC production The total content of the substances of claim 1 derived from PC production, such as a low molecular weight polycarbonate, polycarbonate raw materials, terminal capping agent and modified product thereof is obtained from the peak areas of the substances on the chart of the obtained polycarbonate sample and deposit using the GPC system (column filler; TSK-gel G2000HXL+3000HXL of Tosoh Corporation) of Waters Co., Ltd.

(c) quantitative determination of substances derived from additives

The total content of substances derived from additives is obtained from the calibration line of substances derived from additives contained in the deposit using the UNITY300 NMR apparatus of Varian Co., Ltd. (300 MHz).

(d) amount of Na

The content of metal Na is obtained using inductively coupled plasma emission spectroanalysis.

(e) number of white points after moist heat treatment

To check the formation of white points when a disk is left in an extreme atmosphere for a long time, the disk is kept in a thermo-hygrostat maintained at a temperature of 80° C. and a relative humidity of 85% for 1,000 hours and the number of white points as large as 20 $\mu$m or more is counted using a polarization microscope. This is made on 25 CD substrates (diameter of 120 mm, thickness of 1.2 mm) and 25 DVD substrates (diameter of 120 mm, thickness of 0.6 mm) to obtain an average value which is taken as the number of white points.

EXAMPLE 1

219.4 parts of ion exchange water and 40.2 parts of a 48% aqueous solution of sodium hydroxide were injected into a reactor equipped with a thermometer, stirrer and reflux condenser, 57.5 parts (0.252 mol) of 2,2-bis(4-hydroxyphenyl)propane and 0.12 part of hydrosulfite were dissolved in this solution, 181 parts of methylene chloride was added, and 28.3 parts of phosgene was blown into the resulting solution at 15 to 25° C. under agitation over 40 minutes. After the blowing of phosgene, 7.2 parts of a 48% aqueous solution of sodium hydroxide and 2.42 parts of p-tert-butylphenol were added, stirred and emulsified, 0.06 part of triethylamine was added and stirred at 28 to 33° C. for 1 hour to complete a reaction. After the end of the reaction, the reaction product was diluted with methylene chloride, washed with water, made acidity with hydrochloric acid and washed with water. When the conductivity of a water phase became almost equal to that of ion exchange water, the polycarbonate solution was added dropwise to hot water in an kneader including a sealing chamber having a foreign matter extraction port in its bearing unit to produce a flaky polycarbonate resin while methylene chloride was distilled off. Thereafter, this flaky polycarbonate resin containing water was ground and dried to obtain a powder having a viscosity average molecular weight of 15,000. A heat stabilizer and a release agent were added to the powder as additives in amounts shown in Table 1 and melt kneaded together at a cylinder temperature of 240° C. by a vented double-screw extruder (KTX-46 of Kobe Steel, Ltd.) under degassing to obtain a pellet shown in Example 1. The total content of substances derived from PC production in this pellet is shown in Table 2.

The pellet was used to mold 10,000 CD substrates to measure the weight and composition ratio of deposits on the stamper. The results are shown in Table 2.

EXAMPLE 2

A pellet having composition shown in Table 1 was produced in the same manner as in Example 1. The total content of substances derived from PC production in this pellet is shown in Table 2.

The pellet was used to mold 10,000 DVD substrates to measure the weight and composition ratio of deposits on the stamper. The results are shown in Table 2.

EXAMPLE 3

A pellet having composition shown in Table 1 was produced in the same manner as in Example 1 except that 10 l of acetone per 1 kg of the polycarbonate powder obtained in Example 1 was added, stirred at room temperature for 2 hours, filtered and dried under vacuum to obtain a purified polycarbonate. The total content of substances derived from PC production in this pellet is shown in Table 2. Thereafter, 10,000 CD substrates were molded in the same manner as in Example 1 to evaluate a deposit. The results are shown in Table 2.

EXAMPLE 4

A purified polycarbonate powder was obtained in the same manner as in Example 3 to produce a pellet in the same manner as in Example 1 using the powder in an amount shown in Table 1. The total content of substances derived from PC production in this pellet is shown in Table 2.

DVD substrates were molded using this pellet in the same manner as in Example 2 and evaluated. The results are shown in Table 2.

EXAMPLE 5

A pellet having composition shown in Table 1 was produced in the same manner as in Example 1 except that 2.72 parts of p-tert-butylphenol was added to obtain a powder having a viscosity average molecular weight of 14,000. The total content of substances derived from PC production in this pellet is shown in Table 2. CD substrates were molded in the same manner as in Example 1 and evaluated. The results are shown in Table 2.

EXAMPLE 6

50.2 parts (0.22 mol) of 2,2-bis(4-hydroxyphenyl) propane, 49.2 parts (0.23 mol) of diphenyl carbonate (of Bayer AG) and 0.000005 part of sodium hydroxide and 0.0016 part of tetramethylammonium hydroxide as catalysts were injected into a reactor equipped with a stirrer and fractionating column and the inside of the reactor was substituted with nitrogen. The mixture was dissolved by heating at 200° C. under agitation. Thereafter, most of the formed phenol was distilled off at a reduced pressure of 30 Torr (about 4,000 Pa) under heating in 1 hour and a polymerization reaction was carried out by further elevating the temperature to 270° C. at a reduced pressure of 1 Torr (133 Pa) for 2 hours, and then 0.51 part of 2-methoxycarbonylphenylphenyl carbonate was added as a terminal capping agent. A terminal capping reaction was then carried out at 270° C. and 1 Torr (133 Pa) or less for 5 minutes. 0.00051 parts ($4\times10^{-5}$ mol/1 mol of bisphenol) of tetrabutylphosphonium dodecylbenzene sulfonate as neutrizating agent was added to continue the reaction at 270° C. and 10 Torr (about 1,330 Pa) or less for 10 minutes to obtain a polymer having a viscosity average molecular weight of 15,100. This polymer was supplied into an extruder by a gear pump. A heat stabilizer and a release agent were added as additives before the extruder in amounts shown in Table 1 to obtain a pellet shown in Example 6.

The total content of substances derived from PC production in the obtained pellet is shown in Table 2. CD substrates were molded in the same manner as in Example 1 and evaluated. The results are shown in Table 2.

Comparative Example 1

A powder was produced in the same manner as in Example 1 except that the reaction was terminated after 2 hours of agitation without adding triethylamine and only washing with water was carried out. Additives were added to this powder in amounts shown in Table 1 to obtain a pellet shown in Comparative Example 1 in the same manner as in Example 1. The total content of substances derived from PC production in this pellet is shown in Table 2. CD substrates were molded in the same manner as in Example 1 and evaluated. The results are shown in Table 2.

Comparative Example 2

A pellet was produced in the same manner as in Comparative Example 1 except that a heat stabilizer and a release agent were added as additives in amounts shown in Table 1. The total content of substances derived from PC production in this pellet is shown in Table 2. DVD substrates were molded in the same manner as in Example 2 and evaluated. The results are shown in Table 2.

Comparative Example 3

A polycarbonate powder was obtained in the same manner as in Example 5 and additives were added to this powder in amounts shown in Table 1 to produce a pellet in the same manner as in Example 1. The total content of substances derived from PC production in this pellet is shown in Table 2. CD substrates were molded in the same manner as in Example 1 and evaluated. The results are shown in Table 2.

The following experiments were conducted to find the relationship between the content of Na and the formation of white points after a moist heat treatment.

EXAMPLE 7

A polycarbonate powder was obtained in the same manner as in Example 1 and additives were added to this powder in amounts shown in Table 3 to produce a pellet in the same manner as in Example 1. The total content of substances derived from PC production and the content of Na in this pellet are shown in Table 4. CD substrates were molded in the same manner as in Example 1 and the number of white points after the moist heat treatment of each of the CD substrates was measured and evaluated. The results are shown in Table 4.

EXAMPLE 8

A polycarbonate powder was obtained in the same manner as in Example 1 and additives were added to this powder in amounts shown in Table 3 to produce a pellet in the same manner as in Example 1. The total content of substances derived from PC production and the content of Na in this pellet are shown in Table 4. DVD substrates were molded in the same manner as in Example 2 and the weight and composition ratio of deposits on a stamper were measured. Further, the number of white points after the moist heat treatment of each of the DVD substrates molded out of this material was measured. The results are shown in Table 4.

EXAMPLE 9

A purified polycarbonate powder was obtained in the same manner as in Example 3 and a pellet was produced in the same manner as in Example 1 using the powder in an amount shown in Table 3. The total content of substances derived from PC production and the content of Na in this pellet are shown in Table 4. CD substrates were molded using this pellet in the same manner as in Example 1 and evaluated. The results are shown in Table 4.

EXAMPLE 10

A purified polycarbonate powder was obtained in the same manner as in Example 3 and a pellet was produced in the same manner as in Example 1 using the powder in an amount shown in Table 3. The total content of substances derived from PC production and the content of Na in this pellet are shown in Table 4. DVD substrates were molded in the same manner as in Example 2 using this pellet and evaluated. The results are shown in Table 4.

EXAMPLE 11

A purified polycarbonate powder was obtained in the same manner as in Example 5 and a pellet was produced in the same manner as in Example 1 using the powder in an amount shown in Table 3. The total content of substances derived from PC production and the content of Na in this pellet are shown in Table 4. CD substrates were molded in the same manner as in Example 1 using this pellet and evaluated. The results are shown in Table 4.

EXAMPLE 12

A purified polycarbonate powder was obtained in the same manner as in Example 6 and a pellet was produced in the same manner as in Example 1 using the powder in an amount shown in Table 3. The total content of substances derived from PC production and the content of Na in this pellet are shown in Table 4. CD substrates were molded in the same manner as in Example 1 using this pellet and evaluated. The results are shown in Table 4.

Comparative Example 4

A polycarbonate powder was obtained in the same manner as in Comparative Example 1 and a pellet was produced in the same manner as in Example 1 using the powder in an amount shown in Table 3. The total content of substances derived from PC production and the content of Na in this pellet are shown in Table 4. CD substrates were molded in the same manner as in Example 1 using this pellet and evaluated. The results are shown in Table 4.

Comparative Example 5

A polycarbonate powder was obtained in the same manner as in Comparative Example 1 and a pellet was produced in the same manner as in Example 1 using the powder in an amount shown in Table 3. The total content of substances derived from PC production and the content of Na in this pellet are shown in Table 4. The results are shown in Table 4. A purified polycarbonate powder was obtained in the same manner as in Example 5 and a pellet was produced in the same manner as in Example 1 using the powder in an amount shown in Table 3. The total content of substances derived from PC production and the content of Na in this pellet are shown in Table 4. CD substrates were molded in the same manner as in Example 1 using this pellet and evaluated. The results are shown in Table 4.

Comparative Example 6

A polycarbonate powder was obtained in the same manner as in Example 1 and additives were added to his powder in amounts shown in Table 3 to produce a pellet in the same manner as in Example 1. The total content of substances derived from PC production and the content of Na in this pellet are shown in Table 4. CD substrates were molded in the same manner as in Example 1 and evaluated. The results are shown in Table 4.

It is obvious from these results that it is necessary to reduce the total amount of substances having a 5% weight reduction start temperature measured by thermogravimetric analysis of 400° C. or less and contained in a polycarbonate resin molding material for optical use which is used to mold substrates to 1 wt % or less so as to obtain high-density optical disk substrates retaining high reliability for a long time economically and efficiently and it is desired to reduce the content of Na in the above polycarbonate resin molding material to 1 ppm or less.

TABLE 1

| | Ex. 1 | Ex. 2 | Ex. 3 | Ex. 4 | Ex. 5 | Ex. 6 | C. Ex. 1 | C. Ex. 2 | C. Ex. 3 |
|---|---|---|---|---|---|---|---|---|---|
| trimethyl phosphate | 0.005 | | | 0.005 | | | | | 0.005 |
| phosphorous acid | | | | | | | | 0.002 | |
| trisnonylphenyl phosphite | 0.003 | | | 0.003 | | | | | 0.003 |
| tris(2,4-di-t-butylphenyl) phosphite | | | 0.010 | | 0.005 | 0.005 | 0.010 | | |
| (2,4-di-t-butylphenyl)-4,4'-biphenylene diphosphonite | | 0.003 | | | | | | 0.010 | |
| glycerin monostearate | 0.045 | 0.030 | 0.080 | 0.045 | 0.025 | 0.025 | 0.080 | | 0.150 |
| pentaerythritol tetrastearate | | | | | | | | 0.080 | |
| total (wt %) | 0.048 | 0.033 | 0.090 | 0.048 | 0.030 | 0.030 | 0.090 | 0.092 | 0.153 |

Ex.: Example
C. Ex.: Comparative Example

TABLE 2

| | Ex. 1 | Ex. 2 | Ex. 3 | Ex. 4 | Ex. 5 | Ex. 6 | C. Ex. 1 | C. Ex. 2 | C. Ex. 3 |
|---|---|---|---|---|---|---|---|---|---|
| Mv | 15,000 | 15,000 | 15,000 | 15,000 | 14,000 | 15,000 | 15,000 | 15,000 | 14,000 |
| (A) substances derived from PC production (wt %) | 0.520 | 0.510 | 0.260 | 0.220 | 0.860 | 0.410 | 1.200 | 1.200 | 0.910 |
| (b) substances derived from additives (wt %) | 0.048 | 0.033 | 0.090 | 0.048 | 0.030 | 0.030 | 0.090 | 0.092 | 0.153 |
| total (wt %) | 0.568 | 0.543 | 0.350 | 0.268 | 0.890 | 0.440 | 1.290 | 1.312 | 1.063 |
| molded product | CD | DVD | CD | DVD | CD | CD | CD | DVD | CD |
| evaluation of deposition | B | B | A | A | B | A | C | C | D |
| ratio of (A) to (B) | 32:68 | 46:54 | 25:75 | 30:70 | 48:52 | 40:60 | 39:61 | 42:58 | 20:80 |

Ex.: Example
C. Ex.: Comparative Example

TABLE 3

|  | Ex. 7 | Ex. 8 | Ex. 9 | Ex. 10 | Ex. 11 | Ex. 12 | C. Ex. 4 | C. Ex. 5 | C. Ex. 6 |
|---|---|---|---|---|---|---|---|---|---|
| phosphorous acid | 0.001 | | | | | | | | |
| trisnonylphenyl phosphite | | 0.005 | | | 0.003 | | | 0.004 | |
| tris(2,4-di-t-butylphenyl) phosphite | 0.005 | | 0.003 | | 0.002 | | 0.005 | | |
| (2,4-di-t-butylphenyl)-4,4'-biphenylene diphosphonite | | | | 0.003 | | 0.005 | | | 0.005 |
| glycerin monostearate | 0.050 | 0.040 | 0.030 | | | | | 0.200 | |
| pentaerythritol tetrastearate | | | | 0.030 | 0.010 | 0.020 | 0.040 | | 0.030 |
| total (wt %) | 0.056 | 0.045 | 0.033 | 0.033 | 0.015 | 0.025 | 0.045 | 0.204 | 0.035 |

Ex.: Example
C. Ex.: Comparative Example

TABLE 4

|  | Ex. 7 | Ex. 8 | Ex. 9 | Ex. 10 | Ex. 11 | Ex. 12 | C. Ex. 4 | C. Ex. 5 | C. Ex. 6 |
|---|---|---|---|---|---|---|---|---|---|
| Mv | 15,100 | 15,000 | 15,200 | 15,200 | 14,300 | 15,100 | 15,200 | 14,300 | 15,100 |
| (A) substances derived from PC production (wt %) | 0.56 | 0.54 | 0.23 | 0.20 | 0.85 | 0.42 | 1.22 | 0.85 | 0.55 |
| (b) substances derived from additives (wt %) | 0.056 | 0.045 | 0.033 | 0.033 | 0.015 | 0.025 | 0.045 | 0.204 | 0.035 |
| total (wt %) | 0.616 | 0.585 | 0.263 | 0.233 | 0.865 | 0.445 | 1.265 | 1.054 | 0.585 |
| molded product | CD | DVD | CD | DVD | CD | CD | CD | CD | CD |
| evaluation of deposition | A | B | A | A | B | A | C | D | A |
| depositions ratio of (A) to (B) | 28:72 | 35:65 | 24:76 | 31:69 | 46:54 | 50:50 | 55:45 | 14:86 | 33:67 |
| content of Na | 0.3 | 0.4 | 0.3 | 0.1 | 0.5 | 0.3 | 0.3 | 0.2 | 2.3 |
| number of white points | 0.0 | 0.6 | 0.3 | 0.1 | 0.4 | 0.2 | 0.5 | 0.3 | 6.5 |

Ex.: Example
C. Ex.: Comparative Example

According to the molding material of the present invention, the amount of a deposit can be reduced, continuous productivity can be improved and a substrate which can retain high reliability for a long time can be obtained by reducing the total content of substances having a 5% weight reduction start temperature measured by thermogravimetric analysis of 400° C. or less to 1 wt % or less in the molding material and preferably reducing the content of Na to 1 ppm or less in the molding material. The effect obtained by this is exceptional.

What is claimed is:

1. A polycarbonate resin molding material for optical use, which contains a stabilizer and a release agent, which contains substance (A) having a 5% weight reduction start temperature measured by thermogravimetric analysis of 400° C. or less in a total amount of 0.5 wt % or less and which has a viscosity average molecular weight of 10,000 to 22,000.

2. A polycarbonate resin molding material for optical use, which contains a stabilizer and a release agent, wherein when 10,000 optical disk substrates are molded at a cylinder temperature of 340° C. and a mold temperature of 75° C., the amount of a deposit on a stamper is 15 mg or less.

3. A polycarbonate resin molding material for optical use, which contains a stabilizer and a release agent, wherein when 10,000 optical disk substrates are molded at a cylinder temperature of 380° C. and a mold temperature of 115° C., the amount of a deposit on a stamper is 15 mg or less.

4. An optical disk substrate formed from the polycarbonate resin molding material for optical use of claim 1.

5. An optical disk substrate formed from the polycarbonate resin molding material for optical use of claim 2.

6. An optical disk substrate formed from the polycarbonate resin molding material for optical use of claim 3.

7. The optical disk substrate formed of any one of claims 4 to 6, which is used for digital versatile disks.

8. A polycarbonate resin molding material for optical use, which contains a stabilizer and a release agent, which contains substance (A) having a 5% weight reduction start temperature measured by thermogravimetric analysis of 400° C. or less in a total amount of 0.5 wt % or less and a sodium compound in an amount of 1 ppm or less in terms of metal sodium and which has a viscosity average molecular weight of 10,000 to 20,000.

9. The polycarbonate resin molding material for optical use of claim 8, wherein the amount of the sodium compound is 0.6 ppm or less in terms of metal sodium.

10. A polycarbonate resin molding material for optical use, which contains a stabilizer and a release agent, wherein (1) when 10,000 CD optical disk substrates are molded at a cylinder temperature of 340° C. and a mold temperature of 75° C., the amount of a deposit on a stamper is 15 mg or less and (2) the number of white point defects of 20 $\mu$m or more in size is 2 or less per a 120 mm diameter disk-like substrate after an acceleration deterioration test (80° C.×85% RH×1,000 hours) on the optical disk substrates.

11. A polycarbonate resin molding material for optical use, which contains a stabilizer and a release agent, wherein (1) when 10,000 DVD optical disk substrates are molded at a cylinder temperature of 380° C. and a mold temperature of 115° C., the amount of a deposit on a stamper is 15 mg or less and (2) the number of white point defects of 20 $\mu$m or more in size is 2 or less per a 120 mm diameter disk-like substrate after an acceleration deterioration test (80° C.×85% RH×1,000 hours) on the optical disk substrates.

12. An optical disk substrate formed from the polycarbonate resin molding material for optical use of claim 8.

13. An optical disk substrate formed from the polycarbonate resin molding material for optical use of claim 10.

14. An optical disk substrate formed from the polycarbonate resin molding material for optical use of claim 11.

* * * * *

UNITED STATES PATENT AND TRADEMARK OFFICE
CERTIFICATE OF CORRECTION

PATENT NO.   : 6,646,098 B2
DATED        : November 11, 2003
INVENTOR(S)  : Yutaka Dohi It is certified that error appears in the above-identified patent and that said Letters Patent is hereby corrected as shown below:

<u>Title page,</u>
Item [73], change "[73] Assingee: Teijen Chemicals, Tokyo (JP)" to -- [73] Assignee: Teijin Chemicals, Ltd., Tokyo (JP) --

Signed and Sealed this

Seventeenth Day of February, 2004

JON W. DUDAS
*Acting Director of the United States Patent and Trademark Office*